United States Patent
Oniwa et al.

(10) Patent No.: US 7,882,753 B2
(45) Date of Patent: Feb. 8, 2011

(54) MAGNETOSTRICTIVE TORQUE SENSOR AND ELECTRIC POWER STEERING APPARATUS

(75) Inventors: Yoshihiro Oniwa, Utsunomiya (JP); Takashi Miyoshi, Tochigi-ken (JP); Yasuo Shimizu, Shimotsuke (JP); Atsuhiko Yoneda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/406,354

(22) Filed: Mar. 18, 2009

(65) Prior Publication Data
US 2009/0266179 A1 Oct. 29, 2009

(30) Foreign Application Priority Data
Apr. 23, 2008 (JP) .............................. 2008-112149

(51) Int. Cl.
*G01L 3/00* (2006.01)
(52) U.S. Cl. .................................. 73/862.333
(58) Field of Classification Search ..............................
73/862.331–862.338, 862.391
See application file for complete search history.

(56) References Cited

U.S. PATENT DOCUMENTS

| 4,833,926 | A | * | 5/1989 | Todoroki et al. | ....... 73/862.041 |
|---|---|---|---|---|---|
| 4,907,462 | A | * | 3/1990 | Obama et al. | .......... 73/862.335 |
| 5,522,269 | A | * | 6/1996 | Takeda et al. | .......... 73/862.333 |
| 5,712,563 | A | * | 1/1998 | Kawagoe et al. | ....... 324/207.19 |
| 5,811,695 | A | | 9/1998 | Satoh et al. | |
| 6,121,769 | A | * | 9/2000 | Mukai et al. | ........... 324/207.16 |
| 6,595,074 | B2 | * | 7/2003 | Shimizu et al. | ......... 73/862.333 |
| 7,478,568 | B2 | * | 1/2009 | Yoneda et al. | ......... 73/862.333 |
| 7,497,132 | B2 | * | 3/2009 | Harata et al. | ........... 73/862.335 |
| 7,506,554 | B2 | * | 3/2009 | Shimizu et al. | ........ 73/862.331 |
| 2006/0042404 | A1 | | 3/2006 | Shimizu et al. | |
| 2007/0283768 | A1 | | 12/2007 | Yoneda et al. | |

FOREIGN PATENT DOCUMENTS

| JP | 2005-321316 A | 11/2005 |
|---|---|---|
| JP | 2006-64445 A | 3/2006 |
| JP | 2007-283893 A | 11/2007 |
| JP | 2007-309925 A | 11/2007 |

\* cited by examiner

*Primary Examiner*—Lisa M Caputo
*Assistant Examiner*—Octavia Davis
(74) *Attorney, Agent, or Firm*—Arent Fox LLP

(57) ABSTRACT

A magnetostrictive torque sensor includes first and second magnetostrictive films mounted on a pinion shaft and having different magnetic anisotropic properties, a first detecting coil disposed in facing relation to the first magnetostrictive film, a second detecting coil disposed in facing relation to the second magnetostrictive film, a transistor, and a detector for detecting a torque applied to the pinion shaft based on a first detected signal representative of a potential at the junction between the first detecting coil and the second detecting coil.

8 Claims, 9 Drawing Sheets

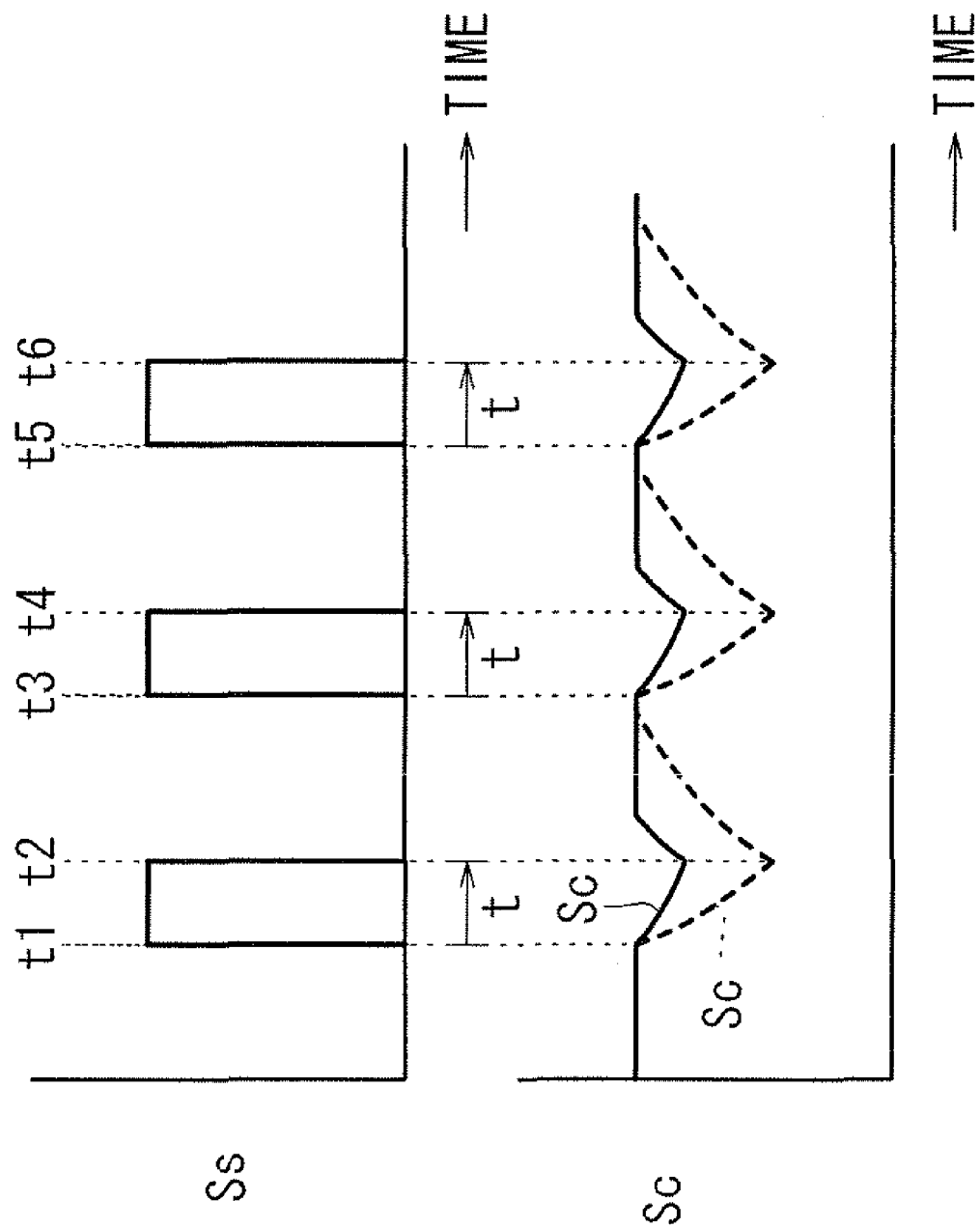

MAGNETOSTRICTIVE TORQUE SENSOR AND ELECTRIC POWER STEERING APPARATUS

BACKGROUND OF THE INVENTION

1. Field of the Invention

The present invention relates to a magnetostrictive torque sensor for detecting a torque based on a change in magnetic characteristics due to magnetostriction, and an electric power steering apparatus including such a magnetostrictive torque sensor.

2. Description of the Related Art

One known contactless torque sensor is a magnetostrictive torque sensor for detecting a torque based on a change in magnetic characteristics due to magnetostriction. The magnetostrictive torque sensor is used to detect the steering torque of automotive steering apparatus (see Japanese Laid-Open Patent Publication No. 2005-321316).

The magnetostrictive torque sensor of the type described above comprises two magnetostrictive films having different magnetic anisotropic properties and mounted on a rotatable shaft and detecting coils disposed in confronting relation to the respective magnetostrictive films. When a torque is applied to the rotatable shaft to twist the rotatable shaft, the magnetic permeability of the magnetostrictive films changes, thereby changing the inductance of the detecting coils.

The detecting coils are intermittently excited through respective switching devices in constant exciting periods. The magnetostrictive torque sensor intermittently detects the torque based on the difference between the detected output signals from the respective detecting coils when the excitation of the detecting coils is finished, i.e., at the ends of the exciting periods. Between adjacent ones of the exciting periods, i.e., between the end of an exciting period and the start of a next exciting period, the energy stored in the inductance of the detecting coils is discharged through resistors.

A driving and detecting circuit of a detecting coil has a specific arrangement shown in FIG. 8 of the accompanying drawings. As shown in FIG. 8, a resistor having a resistance R and a detecting coil having a inductance L are connected in series to a power supply having a voltage E. A transistor Q for switching is connected to the series-connected circuit.

When a switching signal Ss shown in FIG. 9A of the accompanying drawings is supplied to the base of the transistor Q, the detecting coil is excited in exciting periods between time t1 and time t2, time t3 and time t4, and time t5 and time t6.

A change in the voltage of a detected output signal Sc in each of the exciting periods is expressed by the following equation (1):

$$V(t) = E \cdot \exp(-Rt/L) \quad (1)$$

where E represents the voltage of the power supply for excitation, V(t) the voltage at the end of each of the exciting periods, R the resistance of the resistor through which the voltage E is applied to the detecting coil, and L the inductance of the detecting coil.

It has also been proposed to detect a failure of the magnetostrictive torque sensor based on the sum of the detected output signals from the detecting coils (see Japanese Laid-Open Patent Publication No. 2006-064445).

Specifically, Japanese Laid-Open Patent Publication No. 2006-064445 discloses a magnetostrictive torque sensor including additional two detecting coils and two switching devices for allowing the magnetostrictive torque sensor to detect a torque and a failure regardless of a temperature change and a magnetic field change.

Furthermore, Japanese Laid-Open Patent Publication No. 2007-309925 reveals a magnetostrictive torque sensor including four detecting coils in the form of two parallel-connected arms each comprising two series-connected detecting coils. The magnetostrictive torque sensor has a bridge circuit made up of four FETs as switching devices for applying a voltage between the opposite ends of the two detecting coils of each arm while changing the direction of an exciting current (energizing current) in each switching period.

The RL circuit shown in FIG. 8 which is disclosed in Japanese Laid-Open Patent Publication No. 2005-321316 detects a voltage change (transient response voltage) V(t). If a stray resistance occurs between the collector terminal of the transistor Q and the power supply, or such a stray resistance varies, the detected output signal Sc according to the equation (1) changes from a solid characteristic curve shown in FIG. 9B of the accompanying drawings to a dashed characteristic curve shown in FIG. 9B. At this time, it is difficult for the magnetostrictive torque sensor to detect a torque variation stably. Actually, in an automotive steering apparatus, the detecting coils are mounted on the side of the steering shaft and the transistor Q and the power supply are included in an electronic circuit. Therefore, connectors or couplers are generally interposed between the power supply and the series-connected circuit of the resistor and the detecting coil and between the series-connected circuit and the collector terminal of the transistor Q. When the contact resistance (i.e., the above stray resistance) of the connectors changes, the transient response voltage tends to change.

The torque sensor disclosed in Japanese Laid-Open Patent Publication No. 2005-321316 is unable to determine whether a change in the transient response voltage is a desired change to be detected which is based on a change in the inductance that is caused when the steering shaft is twisted, or an increased error caused by a change in the contact resistance of the connectors.

According to the magnetostrictive torque sensor disclosed in Japanese Laid-Open Patent Publication No. 2007-309925, the detected voltage V at the midpoint between the two series-connected detecting coils of each arm is produced as a divided voltage (see the equation (2) below) between impedances Z1, Z2 of the respective inductances L of the series-connected detecting coils to which the power supply voltage E is applied. The divided voltages appearing at the midpoints of the respective arms are detected by a differential amplifier. Even though the connectors are interposed between the four detecting coils and the electronic circuit, the detected voltage (divided voltage) V is essentially not susceptible to a change in the resistances of the connectors.

According to the magnetostrictive torque sensor disclosed in Japanese Laid-Open Patent Publication No. 2007-309925, however, since the bridge circuit of the four FETs is used to energize the four detecting coils, the circuit arrangement is complex with the increased number of wires or interconnects between the electronic circuit including the bridge circuit and the four detecting coils.

$$\text{Detected voltage (divided voltage)} \; V = E \times Z2/(Z1+Z2) \quad (2)$$

SUMMARY OF THE INVENTION

It is an object of the present invention to provide a magnetostrictive torque sensor which is of a simple structure and a low cost, and an electric power steering apparatus including such a magnetostrictive torque sensor.

The present invention is made in relation to Japanese Laid-Open Patent Publication No. 2006-064445, and another object of the present invention is to provide a magnetostrictive torque sensor which is not susceptible to temperature changes and magnetic field changes and which is of a simple structure and a low cost, and an electric power steering apparatus including such a magnetostrictive torque sensor.

According to an aspect of the present invention, a magnetostrictive torque sensor comprises first and second magnetostrictive portions mounted on a shaft and having different magnetic anisotropic properties, a first detecting coil disposed in facing relation to the first magnetostrictive portion and having a terminal for being supplied with a power supply voltage, a second detecting coil disposed in facing relation to the second magnetostrictive portion and having a terminal connected in series to another terminal of the first detecting coil, a switching device connected in series to another terminal of the second detecting coil, and a torque detector for detecting a torque applied to the shaft based on a potential at a junction between the first detecting coil and the second detecting coil.

The magnetostrictive torque sensor and the electric power steering apparatus thus constructed are of a simple arrangement and a low cost because the first detecting coil and the second detecting coil are connected in series between the power supply and the switching device.

Specifically, by connecting only three interconnection wires to the first and second detecting coils, i.e., an interconnection wire (power supply interconnection wire) for supplying the power supply voltage as a common voltage, an interconnection wire (first detected output interconnection wire) for detecting the potential at the junction between the first and second detecting coils, and an interconnection wire (switching interconnection wire) connected to the switching device, the torque detector is enabled to detect a torque. Accordingly, the magnetostrictive torque sensor and the electric power steering apparatus are of a simple arrangement and a low cost.

The magnetostrictive torque sensor may further comprise a third detecting coil disposed in facing relation to the second magnetostrictive portion and having a terminal for being supplied with the power supply voltage, a fourth detecting coil disposed in facing relation to the first magnetostrictive portion and having a terminal connected in series to another terminal of the third detecting coil and another terminal connected to the other terminal of the second detecting coil, and a failure detector for detecting a failure of the magnetostrictive torque sensor based on the potential at the junction between the first detecting coil and the second detecting coil and a potential at a junction between the third detecting coil and the fourth detecting coil.

As the switching device is shared by the first through fourth detecting coils, the magnetostrictive torque sensor is of a simple arrangement and a low cost. By adding only an interconnection wire (second detected output interconnection wire) for detecting the potential at the junction between the third detecting coil and the fourth detecting coil may be added, detection by the torque sensor can be prevented from being adversely affected by temperature changes and magnetic field changes. Consequently, the magnetostrictive torque sensor thus constructed and an electric power steering apparatus incorporating the magnetostrictive torque sensor are of a simple arrangement and a low cost.

Bottom hold circuits having a high input impedance may be connected to the interconnection wires for detecting the potentials at the junctions between the detecting coils. The bottom hold circuits prevent the detector from being adversely affected by changes in impedances (contact resistances) of connectors that are connected to the interconnection wires.

According to the present invention, the magnetostrictive torque sensor and the electric power steering apparatus incorporating the magnetostrictive torque sensor are of a simple arrangement and a low cost.

According to the present invention, furthermore, the magnetostrictive torque sensor which is not susceptible to temperature changes and magnetic field changes and the electric power steering apparatus incorporating the magnetostrictive torque sensor are of a simple arrangement and a low cost.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9A is a waveform diagram of a switching signal corresponding to an exciting signal; and FIG. 9B is a diagram showing a waveform variation (voltage variation) caused by a change in a series-connected resistance component.

DESCRIPTION OF THE PREFERRED EMBODIMENTS

Figure 1:
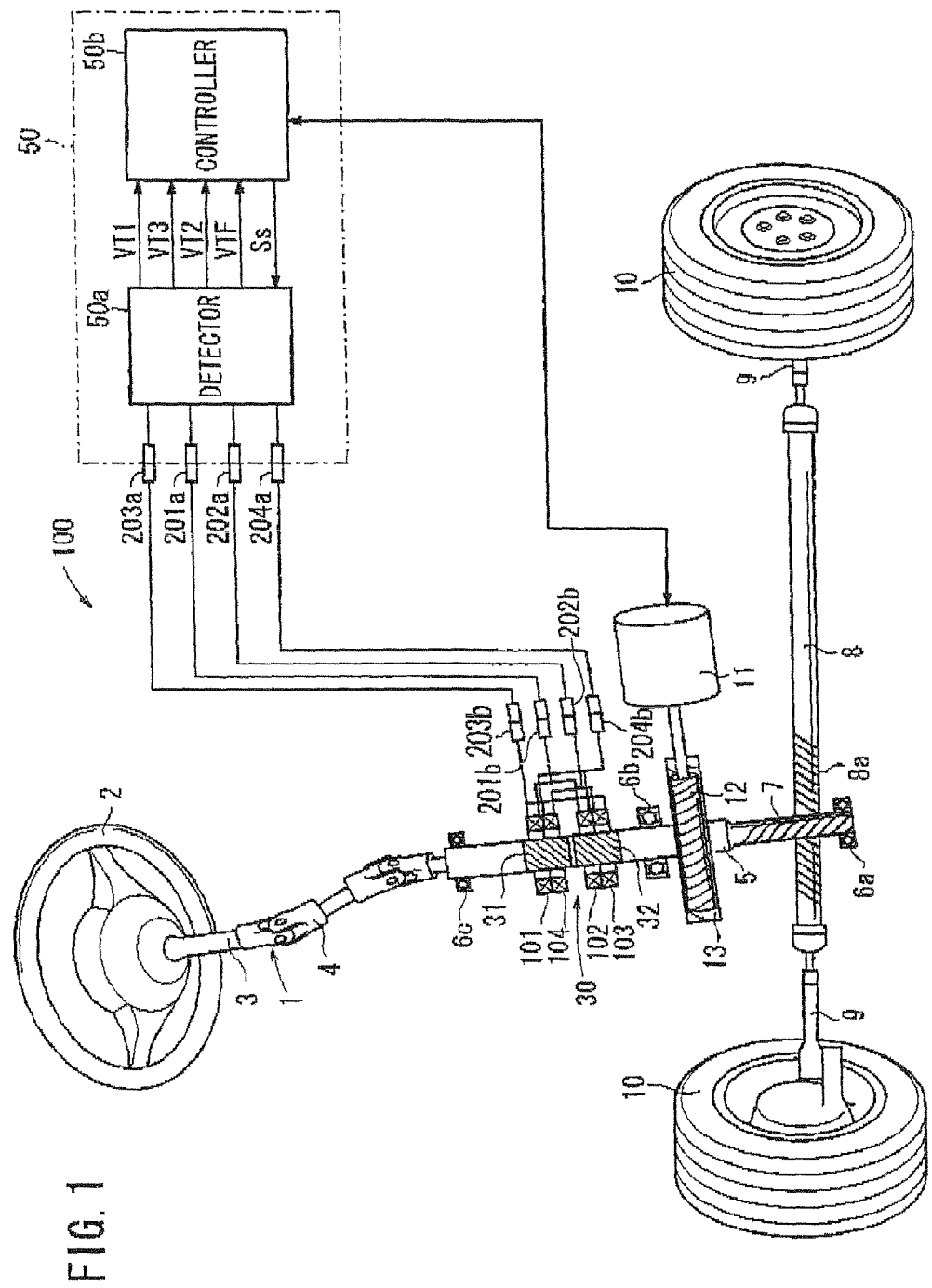
FIG. 1 is a perspective view, partly in cross section and block form, of an electric power steering apparatus incorporating a magnetostrictive torque sensor according to an embodiment of the present invention.

Magnetostrictive torque sensors according to preferred embodiments of the present invention and an electric power steering apparatus including such magnetostrictive torque sensors will be described below with reference to the drawings.

Like or corresponding parts are denoted by like or corresponding reference characters throughout views.

As shown in FIG. 1, an automotive electric power steering apparatus 100 has a steering shaft 1 coupled to a steering wheel (steering means) 2. The steering shaft 1 comprises a main steering shaft 3 integrally connected to the steering wheel 2, a pinion shaft 5 having a pinion 7, and a universal joint 4 interconnecting the main steering shaft 3 and the pinion shaft 5.

The pinion shaft 5 has lower, intermediate, and upper portions rotatably supported by respective bearings 6a, 6b, 6c. The pinion 7 is disposed on the lower end of the pinion shaft 5. The pinion 7 is held in mesh with a rack 8a of a rack shaft 8 which is movable back and forth in the transverse directions of the automobile which incorporates the automotive electric power steering apparatus 100. The pinion 7 and the rack 8a jointly make up a rack and pinion mechanism. The automobile has left and right front wheels 10 as steerable wheels coupled to the respective opposite ends of the rack shaft 8 by respective tie rods 9.

When the driver of the automobile turns the steering wheel 2, the rack and pinion mechanism operates to steer the front wheels 10 to change the direction of the automobile. The rack shaft 8, the rack 8a, and the tie rods 9 jointly make up a steering mechanism.

The automotive electric power steering apparatus 100 also includes an electric motor 11 for supplying an assistive steering force to reduce the steering force applied from the steering wheel 2. The electric motor 11 has an output shaft with a worm gear 12 mounted thereon which is held in mesh with a worm wheel gear 13 that is mounted on the pinion shaft 5 below the intermediate bearing 6b.

A magnetostrictive torque sensor 30 for detecting a torque based on a change in magnetic characteristics due to magnetostriction is mounted on the pinion shaft 5 between the intermediate bearing 6b and the upper bearing 6c.

Figure 2:
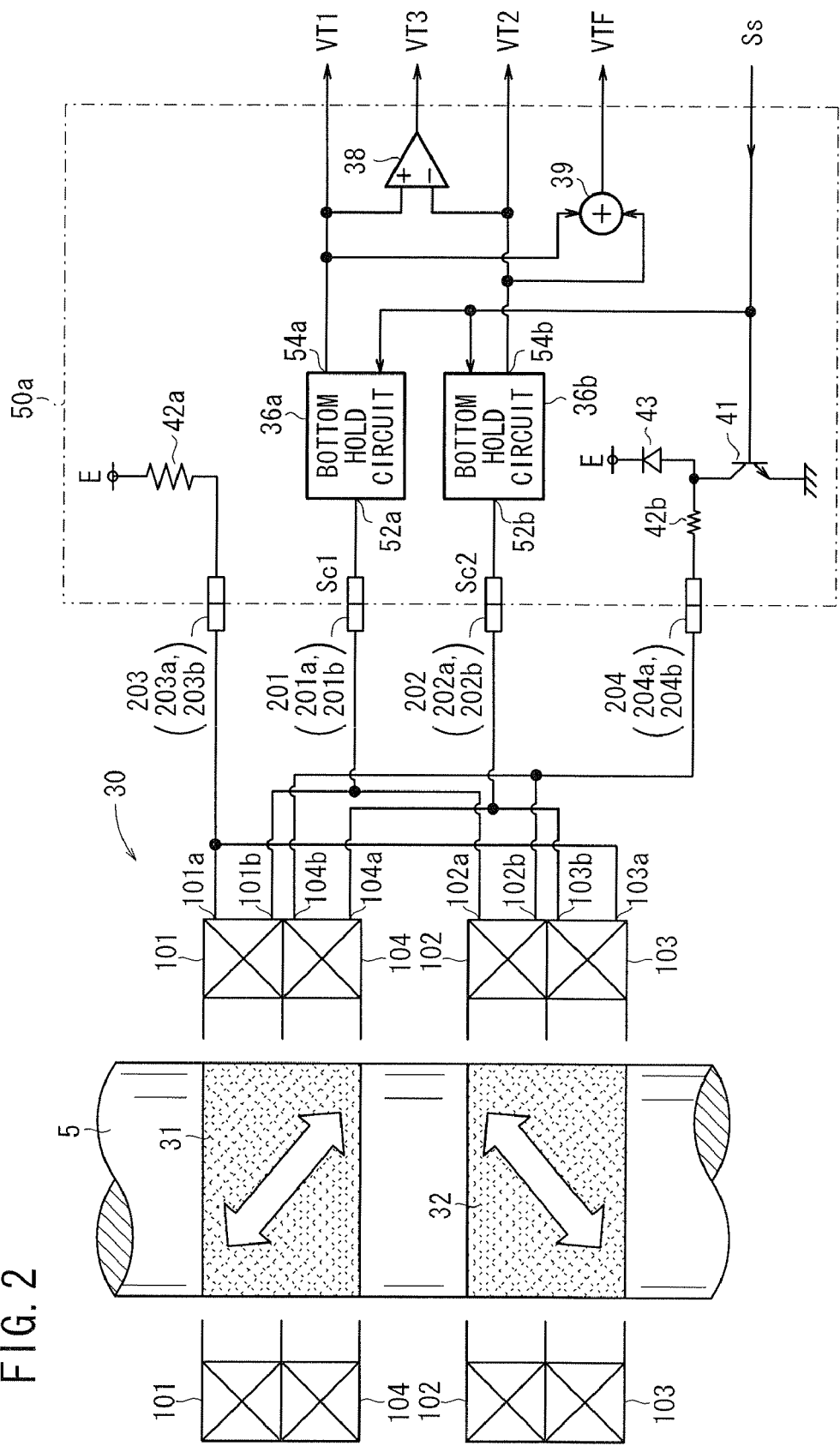
FIG. 2 is a schematic detailed view, partly in block form, of the magnetostrictive torque sensor and a detector shown in FIG. 1.

As shown in FIG. 2, the magnetostrictive torque sensor 30 comprises a first magnetostrictive film (first magnetostrictive portion) 31 and a second magnetostrictive film (second magnetostrictive portion) 32 disposed as annular films fully circumferentially on the outer circumferential surface of the pinion shaft 5, a first detecting coil 101 and a fourth detecting coil 104 disposed around the first magnetostrictive film 31 in spaced facing relation thereto, second detecting coil 102 and a third detecting coil 103 disposed around the second magnetostrictive film 32 in spaced facing relation thereto, and a detector 50a electrically connected to the first through fourth detecting coils 101 through 104.

The first and second magnetostrictive films 31, 32 comprise respective metal films of a material whose magnetic permeability changes greatly when the material is subjected to strain. For example, the first and second magnetostrictive films 31, 32 comprise films of an Ni—Fe alloy that is formed on the outer circumferential surface of the pinion shaft 5 by plating.

The first magnetostrictive film 31 has its magnetic anisotropy oriented obliquely to the axis of the pinion shaft 5 by about 45°. The second magnetostrictive film 32 has its magnetic anisotropy oriented obliquely to the magnetic anisotropy of the first magnetostrictive film 31 by about 90°. In other words, the first and second magnetostrictive films 31, 32 have their magnetic anisotropy held out of phase with each other by about 90°.

The first detecting coil 101 and the fourth detecting coil 104 are disposed coaxially with the first magnetostrictive film 31 with a clearance left therebetween, and held in axially different positions.

The second detecting coil 102 and the third detecting coil 103 are disposed coaxially with the second magnetostrictive film 32 with a clearance left therebetween, and held in axially different positions.

Since the first and second magnetostrictive films 31, 32 have their magnetic anisotropy held out of phase with each other by about 90°, when a torque is applied to the pinion shaft 5, one of the first and second magnetostrictive films 31, 32 is subjected to a compressive force and the other to a tensile force. As a result, the magnetic permeability of one of the first and second magnetostrictive films 31, 32 increases, and the magnetic permeability of the other decreases. Consequently, the inductance of the two detecting coils disposed around one of the first and second magnetostrictive films 31, 32 increases, and the inductance of the two detecting coils disposed around the other decreases.

Changes in the inductances of the first through fourth detecting coils 101 through 104 are converted into voltage changes, which are output to the detector 50a which is part of an ECU (electronic control unit) 50.

The ECU 50 includes the detector 50a and a controller 50b (see FIG. 1).

The controller 50b detects a steering torque applied to the pinion shaft 5 and a failure of the magnetostrictive torque sensor 30 based on output voltages VT1, VT2, VT3, VTF from the detector 50a. The controller 50b also controls the electric motor 11 based on the detected steering torque.

FIG. 2 shows circuit details of the magnetostrictive torque sensor 30 and the detector 50a.

A stabilized power supply voltage E is supplied from an unillustrated power supply, i.e., a battery on the automobile, to the ECU 50 or more specifically the detector 50a. The stabilized power supply voltage E is applied through a resistor 42a, which serves as a damping resistor having a resistance value small enough not to adversely affect the voltage detection based on the above equation (2), and connectors 203 (203a, 203b) and interconnection wires to a terminal 101a of the first detecting coil 101 and a terminal 103a of the third detecting coil 103.

The first detecting coil 101 has another terminal 101b connected to a terminal 102a of the second detecting coil 102 through an interconnection wire and also to an input terminal 52a of a bottom hold circuit (first bottom hold circuit) 36a in the detector 50a through an interconnection wire and connectors 201 (201a, 201b).

The input terminal 52a of the bottom hold circuit 36a is supplied with a first detected signal Sc1 from the magnetostrictive torque sensor 30.

The third detecting coil 103 has another terminal 103b connected to a terminal 104a of the fourth detecting coil 104 through an interconnection wire and also to an input terminal 52b of a bottom hold circuit (second bottom hold circuit) 36b in the detector 50a through an interconnection wire and connectors 202 (202a, 202b).

The input terminal 52b of the bottom hold circuit 36b is supplied with a second detected signal Sc2 from the magnetostrictive torque sensor 30.

The fourth detecting coil 104 and the second detecting coil 102 have respective other terminals 104b, 102b connected to each other through an interconnection wire and also to a terminal of a resistor 42b, which serves as a damping resistor in the detector 50a, through an interconnection wire and connectors 204 (204a, 204b). The other terminal of the resistor 42b is connected to the collector terminal of a transistor (switching device) 41. The collector terminal of the transistor 41 is connected to the power supply through a reverse-recovery diode 43. The transistor 41 has an emitter terminal connected to ground and a base terminal supplied with a switching signal Ss from the controller 50b (see FIG. 1). The damping resistors 42a, 42b have their resistance values that are sufficiently small compared with the impedances of the detecting coils 101, 102. Therefore, the damping resistors 42a, 42b can be regarded as being short-circuited in terms of circuit operation.

Figure 3:
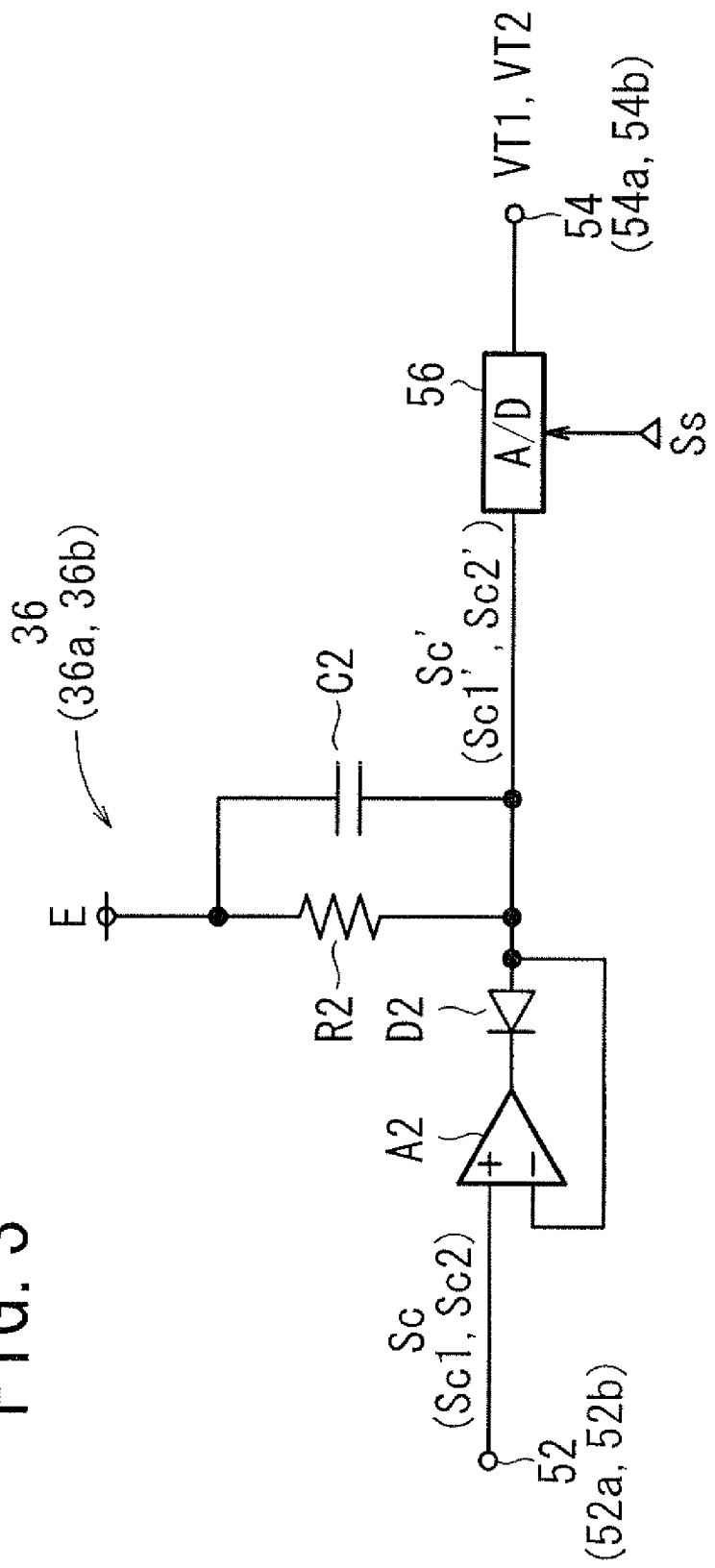
FIG. 3 is a circuit diagram of a bottom hold circuit shown in FIG. 2.

FIG. 3 shows circuit details of each of the bottom hold circuits 36a, 36b (collectively indicated by 36) which are identical to each other.

The input terminal 52, which represents the input terminals 52a, 52b in FIG. 1, of the bottom hold circuit 36 is supplied with a detected signal Sc, which represents the detected signals Sc1, Sc2 in FIG. 1. The input terminal 52 is connected to a noninverting input terminal of a buffer amplifier A2 whose output terminal is connected to the cathode terminal of a diode D2. The anode terminal of the diode D2 is connected to an inverting input terminal of the buffer amplifier A2 and also to an output terminal 54, which represents output terminals 54a, 54b in FIG. 1, of the bottom hold circuit 36 through an A/D converter 56.

A parallel-connected circuit of a resistor R2 and a capacitor C2 is connected between the anode terminal of the diode D2 and the power supply.

A track hold signal Sc', which represents track hold signals Sc1', Sc2', of the detected signal Sc appears at the anode terminal of the diode D2. The track hold signal Sc' will be described below. When the detected signal Sc decreases, the track hold signal Sc' has the same waveform as the detected signal Sc as the track hold signal Sc' follows (tracks) the detected signal Sc. When the detected signal Sc increases under the action of the reverse recovery diode 43, the track hold signal Sc' gradually increases as the capacitor C2 is discharged through the resistor R2, and has a gradually increasing waveform with its bottom held temporarily.

The output terminal 54 of the bottom hold circuit 36 produces output voltages VT1, VT2 which are representative of the held bottom of the track hold signal Sc' that has been sampled by the A/D converter 56.

Operation of the detector 50a and the bottom hold circuit 36 will be described in detail below with reference to timing charts shown in FIGS. 4A, 4B, and 4C.

Figures 4A, 4B, 4C:
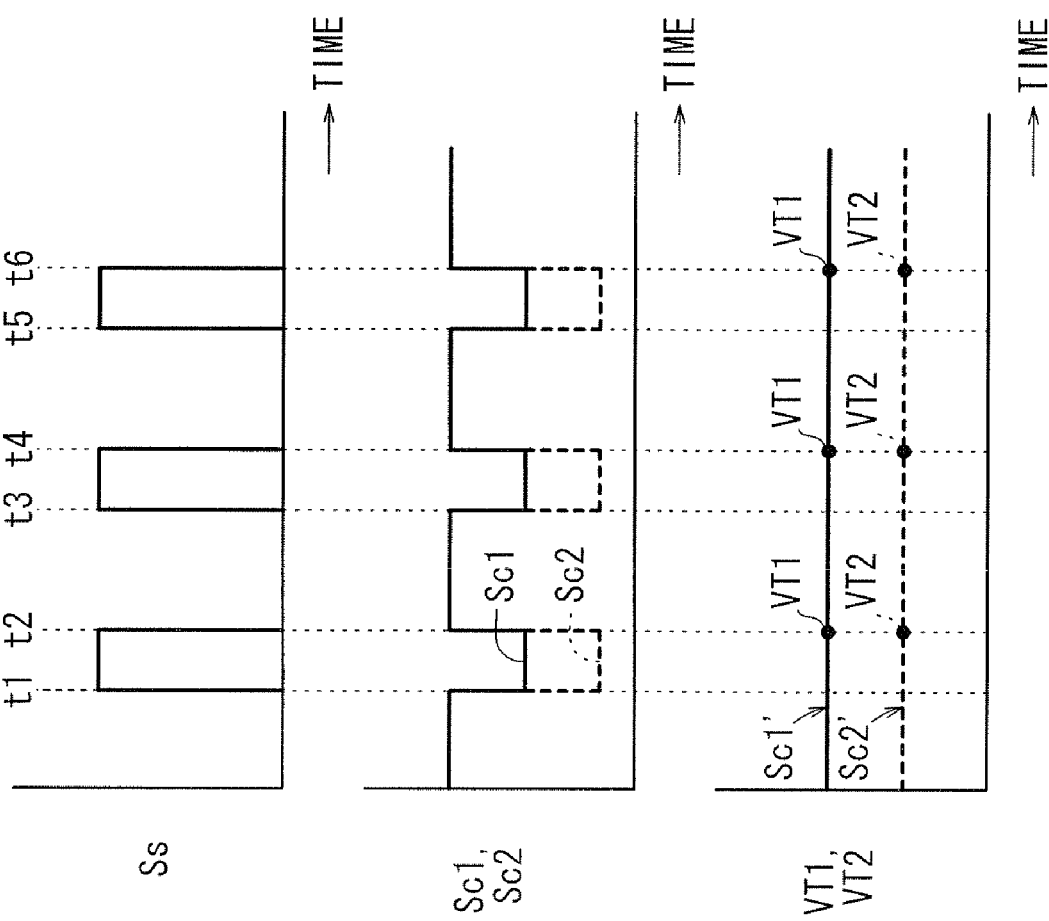
FIGS. 4A, 4B, and 4C are timing charts illustrative of operation of the magnetostrictive torque sensor, FIG. 4A being a waveform diagram of a switching signal, FIG. 4B a waveform diagram of detected signals, and FIG. 4C a waveform diagram of output voltages.

The transistor 41 is turned on and off for given times (identical times) in cyclic periods (identical periods) by the switching signal Ss shown in FIG. 4A.

Specifically, the transistor 41 is turned on during ON times between times t1 and t2, times t3 and t4, and times t5 and t6, in cyclic periods between times t1 and t3, times t3 and t5, and so on.

When the transistor 41 is turned on at time t1, the first through fourth detecting coils 101 through 104 are excited. From time t1 to time t2, the magnetostrictive torque sensor 30 produces a first detected signal Sc1 and a second detected signal Sc2, each having a rectangular waveform, as shown in FIG. 4B, in response to a twist on the pinion shaft 5, according to the above equation (2).

When the voltage of the detected signal Sc (Sc1, Sc2) supplied to the noninverting input terminal of the buffer amplifier A2 drops, the voltage at the output terminal of the buffer amplifier A2 also drops. The diode D2 is rendered conductive, causing the voltage at the inverting input terminal of the buffer amplifier A2 to drop. In other words, while the voltage of the detected signal Sc is falling, the buffer amplifier A2 operates as a voltage follower, causing the same voltage to appear at the inverting input terminal of the buffer amplifier A2 and the output terminal 54 of the bottom hold circuit 36. At the same time, the capacitor C2 is charged. While the voltage of the detected signal Sc is falling, therefore, the track hold signal Sc' follows (tracks) the detected signal Sc.

When the voltage of the detected-signal Sc increases at a low-voltage time, e.g., at time t2, the diode D2 is rendered nonconductive. The resistor R2 serves as a resistor for discharging the capacitor C2.

At this time, the voltage across the capacitor C2 which has been charged is held, and the track hold signal Sc' (Sc1', Sc2') is converted by the A/D converter 56, which produces the first output voltage VT1 and the second output voltage VT2.

FIG. 4C shows a first output voltage VT1 and a second output voltage VT2 which have been produced by interpolating the first output voltage VT1 and the second output voltage VT2 that are obtained at times t2, t4, t6 when the track hold signal Sc' (Sc1', Sc2+) is converted by the A/D converter 56.

A differential amplifier 38 (see FIG. 2), which is illustrated in an analog signal processing fashion, produces a differential signal representative of the difference between the first output voltage VT1 and the second output voltage VT2. The differential signal from the differential amplifier 38 represents a detected torque voltage VT3.

An adder 39, which is illustrated in an analog signal processing fashion, produces a sum signal representative of the sum of the first output voltage VT1 and the second output voltage VT2. The sum signal from the adder 39 represents a detected failure voltage VTF.

Figure 5:
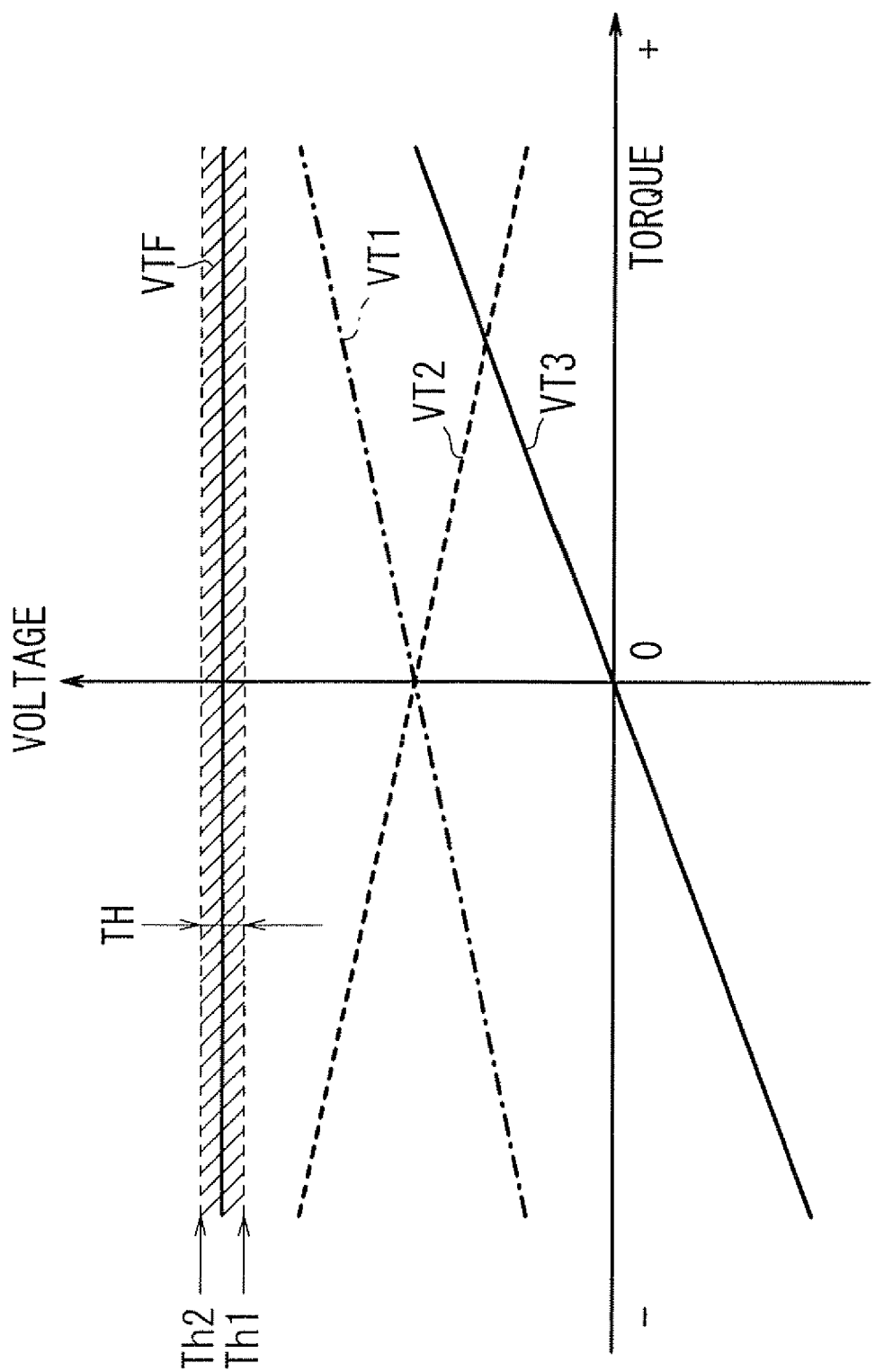
FIG. 5 is a characteristic diagram illustrative of operation of the magnetostrictive torque sensor.

FIG. 5 shows the various output signals from the detector 50a.

It can be seen from FIG. 5 that the differential signal representative of the difference between the first output voltage VT1 and the second output voltage VT2 represents the detected torque voltage VT3, and the sum signal representative of the sum of the first output voltage VT1 and the second output voltage VT2 represents the detected failure voltage VTF. It is well known from FIG. 10, etc. of Japanese Laid-Open Patent Publication No. 2005-321316 that the detected torque voltage VT3 and the detected failure voltage VTF are produced from the detector 50a as described above.

Figure 8:
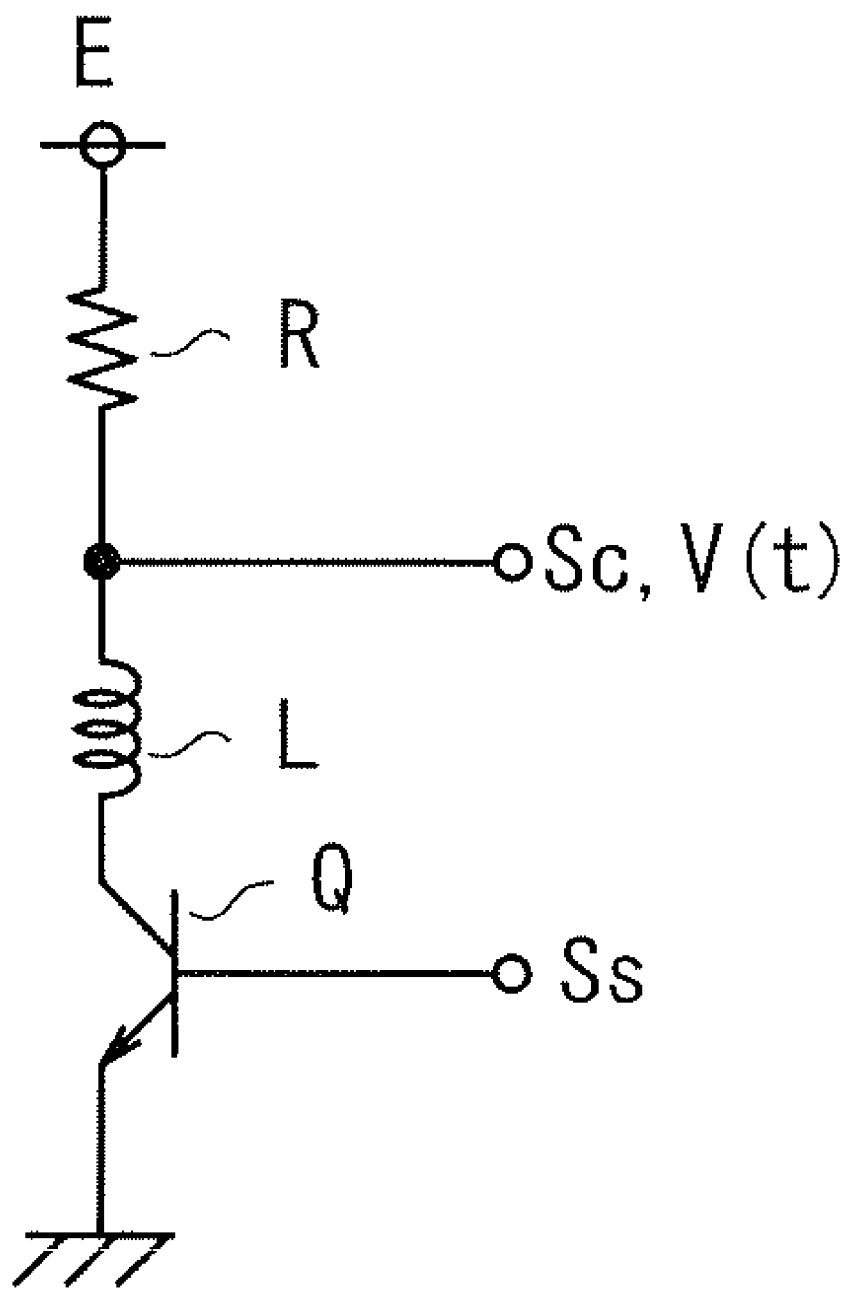
FIG. 8 is a circuit diagram of a driving and detecting circuit according to the related art.

Since the first output voltage VT1 and the second output voltage VT2 are produced using the four detecting coils, i.e., the first through fourth detecting coils 101 through 104, offsets due to a temperature change and a magnetic field change have been canceled therefrom as shown in detail in FIGS. 5, 8, and 11 of Japanese Laid-Open Patent Publication No. 2006-064445.

As shown in FIG. 5, the controller 50b establishes a failure detecting threshold range TH, i.e., a range between a minimum threshold voltage Th1 and a maximum threshold voltage Th2, for judging the detected failure voltage VTF. If the detected failure voltage VTF falls out of the failure detecting threshold range TH, then the controller 50b judges that the magnetostrictive torque sensor 30 is suffering a failure.

Figure 6:
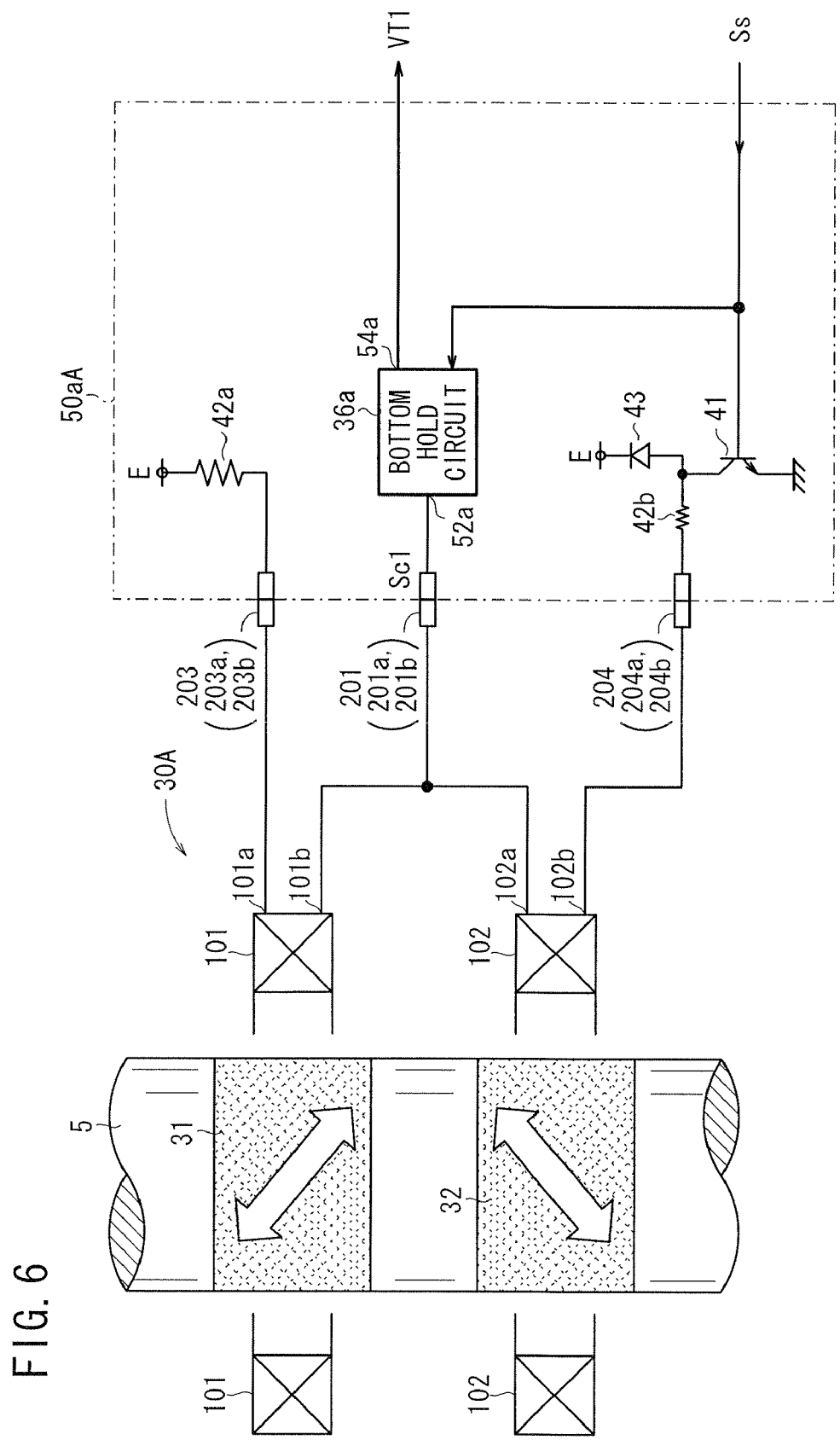
FIG. 6 is a schematic detailed view, partly in block form, of a magnetostrictive torque sensor according to another embodiment of the present invention.

If only a torque is to be detected in an environment free of temperature changes and magnetic field changes or if torques do not need to be detected highly accurately, then a magnetostrictive torque sensor 30A with a detector 50aA according to another embodiment of the present invention shown in FIG. 6 may be used. The magnetostrictive torque sensor 30A with the detector 50aA are devoid of two detecting coils and a single bottom hold circuit from those shown in FIG. 2.

As shown in FIG. 6, the magnetostrictive torque sensor 30A comprises first and second magnetostrictive films 31, 32 disposed on the pinion shaft 5 and having different magnetic anisotropic properties, a first detecting coil 101 disposed around the first magnetostrictive film 31 in spaced facing relation thereto and having a terminal 101a supplied with the power supply voltage E, a second detecting coil 102 disposed around the second magnetostrictive film 32 in spaced facing relation thereto and having a terminal 102a connected to the other terminal 101b of the first detecting coil 101, a transistor 41 as a switching device connected in series to the other terminal 102b of the second detecting coil 102, and a detector 50aA as a torque detector for detecting a torque applied to the pinion shaft 5 based on a first detected signal Sc1 which is representative of the potential at the junction (midpoint) between the first detecting coil 101 and the second detecting coil 102.

As mentioned above, the first and second detecting coils 101, 102 and the transistor 41 which serves as a switching device are connected in series between the power supply and the ground, and the detector 50aA detects the potential at the junction between the first and second detecting coils 101, 102. In this case, by connecting only three interconnection wires to the first and second detecting coils 101, 102, i.e., an interconnection wire (power supply interconnection wire) connected to connectors 203 for supplying the power supply voltage E, an interconnection wire (first detected output interconnection wire) connected to connectors 201 for detecting the potential at the junction between the first and second detecting coils 101, 102, and an interconnection wire (switching interconnection wire) connected to connectors 204 that are connected to the transistor 41, the detector 50aA is enabled to detect a torque based on the first output voltage VT1. Accordingly, the magnetostrictive torque sensor 30A is of a simple arrangement and a low cost.

Figure 7:
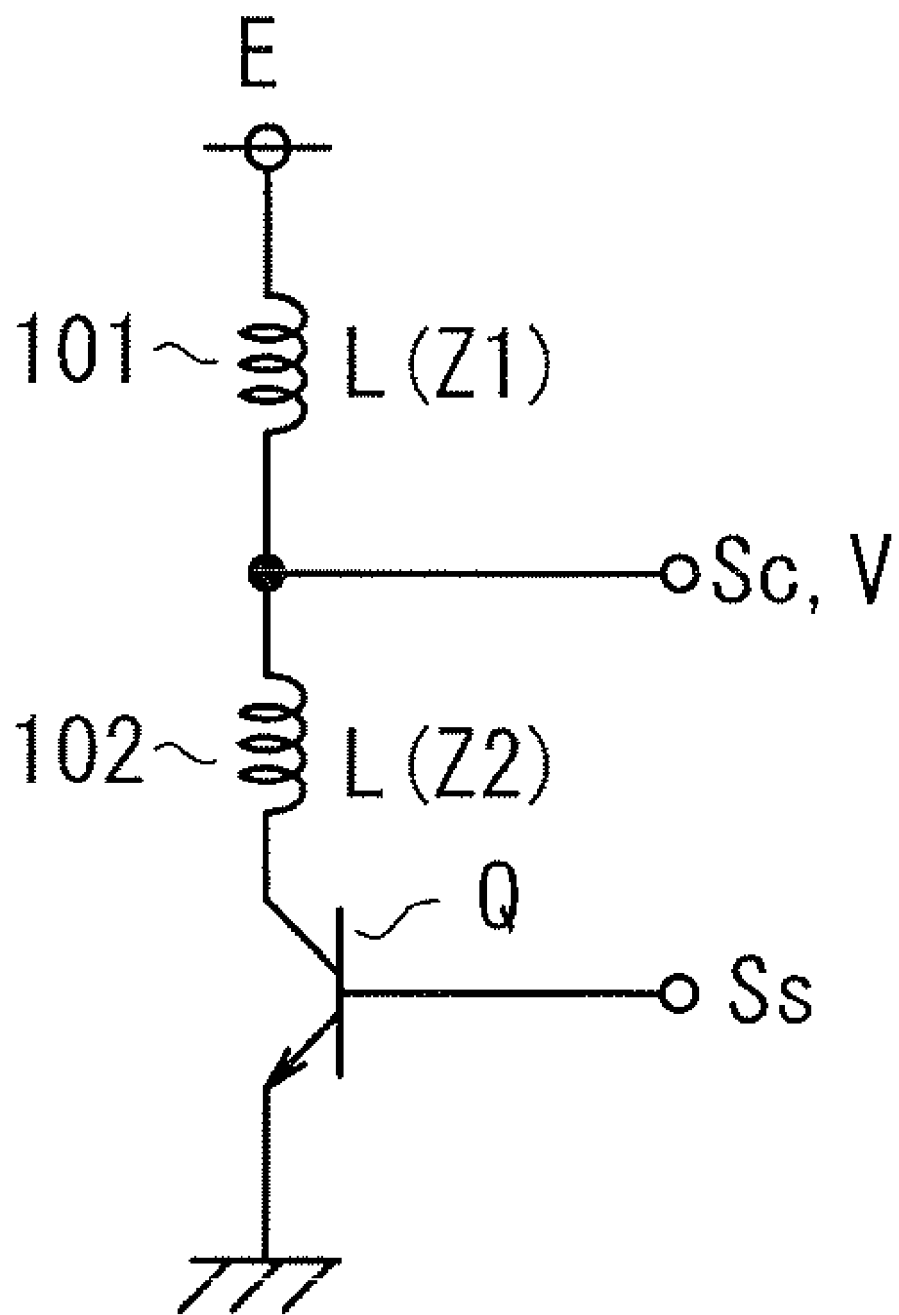
FIG. 7 is a circuit diagram of a driving and detecting circuit according to the present invention.

FIG. 7 shows a driving and detecting circuit for obtaining the detected signal Sc according to the embodiment shown in FIG. 6 in comparison with the driving and detecting circuit according to the related art shown in FIG. 8. The driving and detecting circuit shown in FIG. 7 is a simplified version of the magnetostrictive torque sensor 30A shown in FIG. 6. It can be understood from FIG. 7 that the detected voltage (divided voltage) V representative of the detected signal Sc is produced according to the above equation (2) $V=E \times Z2/(Z1+Z2)$. In FIG. 7, a first detecting coil 101 which has an inductance L and an impedance Z1 and a second detecting coil 102 having an inductance L and an impedance Z2 are connected in series between a power supply and a transistor Q. The driving and detecting circuit shown in FIG. 7 thus makes it possible to construct a magnetostrictive torque sensor which is of a simple arrangement and a low cost and an electric power steering apparatus incorporating such a magnetostrictive torque sensor.

The magnetostrictive torque sensor 30 shown in FIG. 2 is constructed by adding, to the magnetostrictive torque sensor 30A shown in FIG. 6, the third detecting coil 103 disposed around the second magnetostrictive film 32 in spaced facing relation thereto and having the terminal 103a supplied with the power supply voltage E, the fourth detecting coil 104 disposed around the first magnetostrictive film 31 in spaced facing relation thereto and having the terminal 104a connected in series to the terminal 103b of the third detecting coil 103 and the terminal 104b connected to the terminal 102b of the second detecting coil 102, and the detector 50a (failure detector) for detecting a failure of the magnetostrictive torque sensor 30 based on the first detected signal Sc1 representative of the potential at the junction between the first detecting coil 101 and the second detecting coil 102 and the second detected signal Sc2 representative of the potential at the junction between the third detecting coil 103 and the fourth detecting coil 104.

The magnetostrictive torque sensor 30 shown in FIG. 2 is of a simple arrangement and a low cost because the first through fourth detecting coils 101 through 104 share the transistor 41 as the switching device.

According to the interconnection wire layout of the magnetostrictive torque sensor 30 shown in FIG. 2, only an interconnection wire (second detected output interconnection wire) connected to the connectors 202 (see FIG. 2) for detecting the potential at the junction (midpoint) between the third and fourth detecting coils 103, 104 is added to the interconnection wire layout of the magnetostrictive torque sensor 30A shown in FIG. 6, thereby to detect a torque and a failure regardless of a temperature change and a magnetic field change. Consequently, the magnetostrictive torque sensor 30 and the electric power steering apparatus 100 are of a simple arrangement and a low cost.

The detector 50aA shown in FIG. 6 includes the bottom hold circuit 36a as the first bottom hold circuit with a high input impedance which is connected to the junction between the first detecting coil 101 and the second detecting coil 102. Therefore, changes in the detected voltage due to changes in the impedance (contact resistance) of the connectors 201 connected to the interconnection wire are negligible.

Similarly, the detector 50a shown in FIG. 2 includes the bottom hold circuit 36b as the second bottom hold circuit with a high input impedance which is connected to the junction between the third detecting coil 103 and the fourth detecting coil 104. Therefore, changes in the detected voltage due to changes in the impedance (contact resistance) of the connectors 202 connected to the interconnection wire are negligible.

The electric power steering apparatus 100 which incorporates therein the magnetostrictive torque sensor 30 shown in FIG. 2 includes, in addition to the connectors 201, 202, the connectors 203 connected between the terminals 101a, 103a of the first and third detecting coils 101, 103 and the power supply and the connectors 204 connected between the junction between the terminals 102b, 104b of the second and fourth detecting coils 102, 104 and the transistor 41. Since the electric power steering apparatus 100 includes only four sets of the connectors 201 through 204, it is of a simple arrangement and a low cost.

Although certain preferred embodiments of the present invention have been shown and described in detail, it should be understood that various changes and modifications may be made therein without departing from the scope of the appended claims.

What is claimed is:

1. A magnetostrictive torque sensor comprising:
   a power supply voltage;
   a first damping resistor;
   first and second magnetostrictive portions mounted on a shaft and having different magnetic anisotropic properties;
   a first detecting coil disposed in facing relation to the first magnetostrictive portion;
   a second detecting coil disposed in facing relation to the second magnetostrictive portion;
   a second damping resistor;
   a switching device, wherein the first damping resistor, the first detecting coil, the second detecting coil, the second damping resistor, and the switching device are connected in series in this order between the power supply voltage and a ground; and
   a torque detector, wherein the torque detector detects a torque applied to the shaft based on a potential at a junction between the first detecting coil and the second detecting coil.

2. A magnetostrictive torque sensor according to claim 1, further comprising:
   a third detecting coil disposed in facing relation to the second magnetostrictive portion and having a terminal connected to a junction between the first detecting coil and the first damping resistor;

a fourth detecting coil disposed in facing relation to the first magnetostrictive portion and having a terminal connected in series to another terminal of the third detecting coil and another terminal connected to a junction between the second detecting coil and the second damping resistor; and a failure detector, wherein the failure detector detects a failure of the magnetostrictive torque sensor based on the potential at the junction between the first detecting coil and the second detecting coil and a potential at a junction between the third detecting coil and the fourth detecting coil.

3. A magnetostrictive torque sensor according to claim 2, wherein the failure detector comprises:

a first bottom hold circuit having a high input impedance which is connected to the junction between the first detecting coil and the second detecting coil through a connector; and a second bottom hold circuit having a high input impedance which is connected to the junction between the third detecting coil and the fourth detecting coil through a connector.

4. A magnetostrictive torque sensor according to claim 3, further comprising a reverse-recovery diode connected between the power supply voltage and a junction between the second damping resistor and the switching device.

5. An electric power steering apparatus incorporating a magnetostrictive torque sensor according to claim 2, for performing a steering action based on a steering torque detected by the magnetostrictive torque sensor.

6. A magnetostrictive torque sensor according to claim 1, wherein the torque detector comprises:

a first bottom hold circuit having a high input impedance which is connected to the junction between the first detecting coil and the second detecting coil through a connector.

7. An electric power steering apparatus incorporating a magnetostrictive torque sensor according to claim 1, for performing a steering action based on a steering torque detected by the magnetostrictive torque sensor.

8. A magnetostrictive torque sensor according to claim 1, wherein the switching device is turned on and off by a repeated rectangular signal.

\* \* \* \* \*